Oct. 25, 1960    M. C. BROWN ET AL    2,957,247
GROOVE LOCATION AND WIDTH GAUGE
Filed Dec. 15, 1958
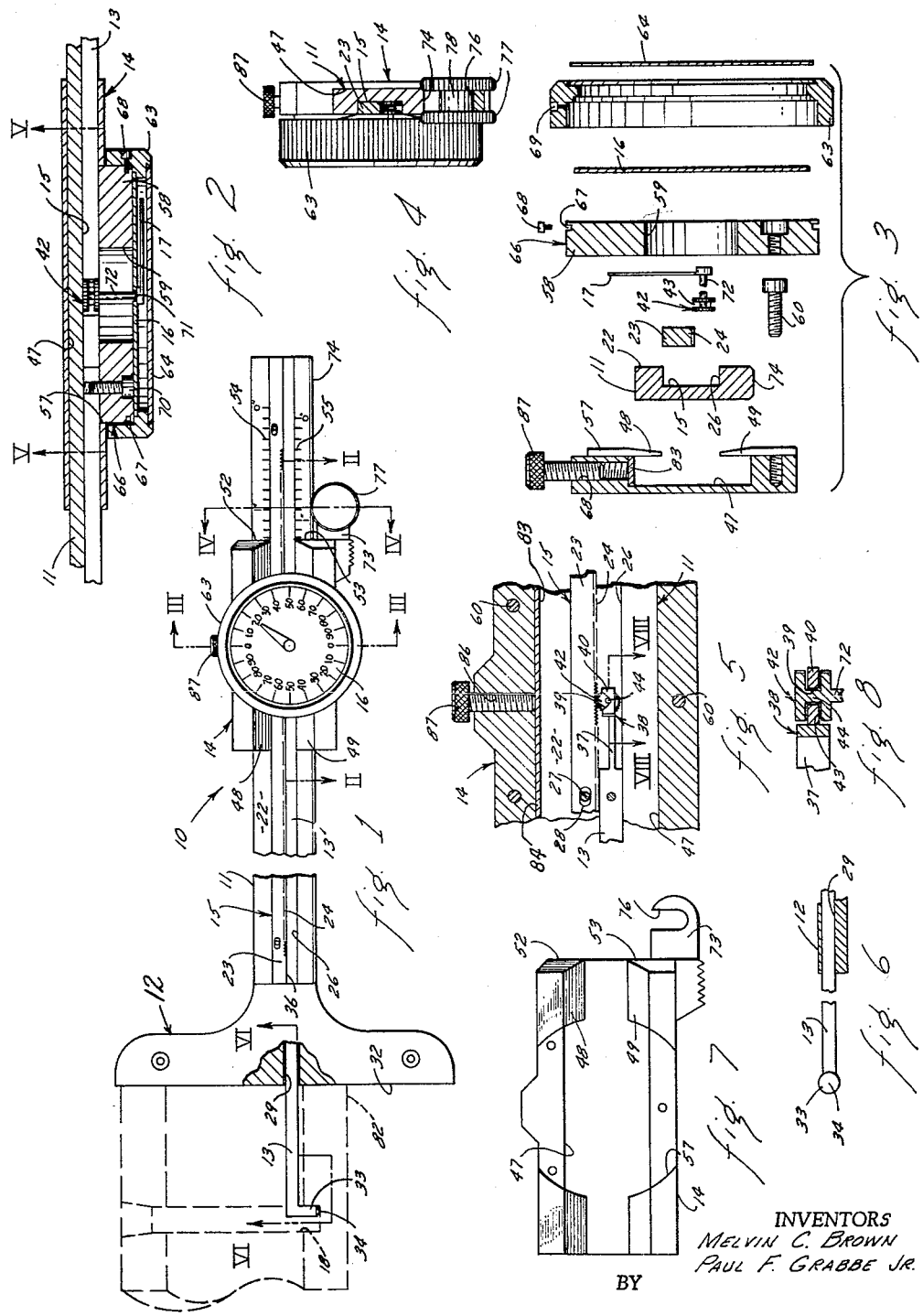
INVENTORS
MELVIN C. BROWN
PAUL F. GRABBE JR.
BY
Woodhams Blanchard & Flynn
ATTORNEYS

United States Patent Office 2,957,247
Patented Oct. 25, 1960

2,957,247

GROOVE LOCATION AND WIDTH GAUGE

Melvin C. Brown, 3020 Onondaga, Kalamazoo, Mich., and Paul F. Grabbe, Jr., Antwerp Township, Van Buren County, Mich. (Rte. 1, Mattawan, Mich.)

Filed Dec. 15, 1958, Ser. No. 780,380

3 Claims. (Cl. 33—147)

This invention relates in general to a measuring instrument or gauge and, more particularly, to a type thereof capable of quickly and easily indicating the location and dimensional accuracy of an opening or recess in an unexposed wall, such as a wall defining the bore of a cylinder.

It will be understood that specific reference is made hereinafter to the use of our gauge on hydraulic valve casings for illustrative purposes, only, and with no intention of limiting the applicability of the invention. The principal purpose of the following discussed example is to point out one type of problem which our gauge is capable of overcoming.

There are numerous instances where an opening or recess, such as an annular groove, must be provided in a wall where it is not easily accessible for measurement by conventional measuring instruments or gauges of the type presently available. For example, in the manufacture of casings for rotary or spool-type cores of hydraulic valves, it is often necessary to provide in the casing multiple ports connected to the cylindrical bore in said casing. It is very difficult according to present procedures and with existing instruments, to determine whether the inner ends of the ports are properly located. Where annular grooves are provided in the inner wall of such cylindrical valve casings, as for the reception of sealing rings, it is not only difficult to determine their exact location with respect to a visible and external part of said casing by existing instruments, but it is also difficult to determine whether the axial distance between the sidewalls of said grooves is accurate.

Ordinarily the proper location of grooves and/or bores in the inner wall of a valve casing becomes important either at the time when a machine is being set up for the purpose of providing such openings or, after the openings have been provided, when inspecting their accuracy. At such times, a need usually exists for an accurate measuring instrument capable of use in making a variety of substantially linear measurements on the exterior parts of the article. Accordingly, it is equally important that, if possible, the instrument provided for effecting inside measurements, as set forth above, is also capable of use in making outside measurements of a substantially ordinary type.

Accordingly, a primary object of this invention has been the provision of an easily operable measuring instrument capable of accurately determining the location, and certain dimensions, of openings in the interior wall of a structure, such as a cylindrical valve casing, which openings are not easily accessible for measurement according to existing procedures and by means of presently available instruments.

A further object of this invention has been the provision of a measuring instrument, as aforesaid, which is very easy to operate, which is extremely accurate in its determinations, which can be used by any person capable of utilizing any type of conventional and carefully calibrated measuring device, and which can be used in a variety of measuring applications in addition to the particular measuring application giving rise to the invention.

A further object of this invention has been the provision of a measuring instrument, as aforesaid, the operating principles of which can be applied to a wide range of applications both in size and type, which instrument can be easily and accurately manufactured, which is construed for easy and accurate adjustment and which is sturdily constructed so that it will not only resist damage due to rough handling but will tend to remain in adjustment during long periods of use providing even moderate care is exercised in its use.

Other objects and purposes of this invention will become apparent to persons familiar with this type of equipment upon reading the following specification and examining the accompanying drawings in which:

Figure 1 is a broken side elevational view of said measuring instrument embodying the invention and as applied to one type of use.

Figure 2 is a sectional view substantially as taken along the line II—II in Figure 1.

Figure 3 is an exploded sectional view taken along the line III—III in Figure 1.

Figure 4 is a sectional view substantially as taken along the line IV—IV in Figure 1.

Figure 5 is a sectional view taken along the line V—V in Figure 2.

Figure 6 is a sectional view substantially as taken along the line VI—VI in Figure 1.

Figure 7 is a side elevational view of a portion of the dial supporting slider.

Figure 8 is a sectional view taken along the line VIII—VIII in Figure 5.

For convenience in description, the terms "inner," "outer" and derivatives thereof have reference herein to the geometric center of the measuring instrument embodying the invention or parts thereof. Other similar terms of reference, such as "left" and "right" as applied to Figure 1, may be used for convenience and without any intention of limiting the scope of the invention.

*General description*

The objects and purposes of the invention, including those set forth above, have been met by providing a measuring instrument comprised of an elongated guide member upon which an elongated beam is slidably supported for movement lengthwise of said guide member. The guide member has at one end thereof an integral head with a transverse positioning face beyond which the outer end of the beam will normally extend. The inner end of the beam rotatably supports a gear engageable with rack teeth on said guide member. A slider, having a circular dial face mounted thereon, is connected to the beam near its inner end and is slidably supported upon the guide member for movement lengthwise thereof. A dial pointer is disposed adjacent to said dial face and is secured to and rotatable with said gear for indicating the movement of the beam lengthwise of the guide member. Scale markings are provided on the front side of the guide member, also for indicating the beam movement. The outer end of the beam has a sidewardly extending element which is engageable in an opening or recess in the interior of an article, such as a hydraulic valve casing, for determining the distance between the opening and the outside surface of the article against which the positioning face of said head is held.

*Detailed description*

The measuring instrument 10 (Figure 1), herein disclosed for the purpose of illustrating one embodiment of the invention, is comprised of an elongated guide member 11 having a positioning head 12 at one extreme end thereof and slidably supporting an elongated beam 13 within a lengthwise groove 15 in said member 11 for movement lengthwise thereof. A slider 14, having a dial face 16, is slidably supported upon said guide member 11 and is secured to the inner end of the beam 13, whereby said slider 14 and beam 13 are moved simultaneously with respect to and along the guide member 11. A pointer 17 is disposed adjacent to the dial face 16 and is rotatably supported upon said inner end of the beam 13.

A rack 23 (Figures 1 and 3), having teeth 24 is disposed within a portion of the groove 15 so that said teeth 24 are facing and spaced from one side wall 26 of said groove. The rack 23 is held in said groove 15 by means, such as the screws 27, which extend through screw openings 28 in the rack 23. The screw openings 28 may, if desired, be slightly elongated lengthwise of the rack 23 for the purpose of permitting minor lengthwise adjustment of the rack 23 with respect to the guide member 11.

The positioning head 12 (Figure 1) is secured to and extends transversely of the guide member 11 and has an opening 29 which is aligned with the groove 15 and through which the beam 13 slidably extends. The extreme leftward or positioning face 32 of the head 12 (Figures 1 and 6) preferably defines a plane perpendicular to the lengthwise extent of both the member 11 and beam 13.

An engaging element 33 (Figures 1 and 6) is rigidly secured to the outer end of the beam 13 and extends sidewardly therefrom. In this particular embodiment, the element 33 is cylindrical and its central axis is parallel with the positioning face 32 of the head 12 as well as the lengthwise extent of said head 12. The free end of the element 33 may be conically tapered for the purpose of providing a centered stylus point 34.

The beam 13 (Figure 1) is slidably disposed within the groove 15 between the side wall 26 thereof and the rack 23. The teeth 24 on said rack 23 preferably terminate at a point spaced from the head 12 to provide a bearing surface 36 engageable with the adjacent surface of the beam 13 to prevent interference thereof with the teeth 24. The inner end of the beam 13 (Figure 5) is materially reduced in thickness in a direction perpendicular to the side wall 26 in order to provide a resiliently flexible arm 37. A T-shaped element 38 is secured to the outer end of the arm 37 (Figures 5 and 8) so that its thin, flat stem 40 is spaced from the walls of the groove 21 and the teeth of the rack 23. The stem 40 which is parallel with the side 22 of the member 11, has a notch 39 in the edge thereof facing the teeth of the rack 23.

A gear 42 (Figures 5 and 8) has an annular groove 43 between its axial ends which provides a journal 44 between the two portions of the gear. The stem 40 is slidably received into the groove 43 for rotatably supporting the journal 44 of said gear 42 within the notch 39. The diameter of the journal 44 and the gear 42, the depth of the notch 39 and the location of the resilient arm 37 are carefully selected so that the outer end of the arm 37 will be slightly flexed away from the rack 23 when the teeth thereof are engaged by the gear 42 as it is supported by the element 38.

The slider 14 has an undercut channel 47 (Figures 3, 4 and 7), in one side thereof in which the guide member 11 is snugly but slidably received. The lips 48 and 49 on said slider 14, which overlie a portion of the channel 47, are preferably spaced from each other a distance approximately equal to the width of the groove 15 in the guide member 11. Accordingly, the adjacent end edges 52 and 53 of the lips 48 and 49, respectively, serve as position indicators for the slider 14 with respect to the scales 54 and 55, respectively, on the side 22 of the member 11 adjacent to the opposite edges of the groove 15. The scales 54 and 55 are, in this particular embodiment, arranged in increments of 0.100 of an inch and the scale 55 is offset with respect to the scale 54 toward the positioning head 12 by 0.100 of an inch. The engaging element 33 at the outer end of the beam 13 has a diameter of 0.100 of an inch. Accordingly, the scale 55 is utilized to measure dimensions between the face 32 and the adjacent side of the element 33, whereas the scale 54 is utilized to indicate measurements between the face 32 and the outside surface of the element 33.

A circular recess 57 (Figures 3 and 7) is provided in the face of the slider 14 so that it penetrates the lips 48 and 49 for snug reception of an annular dial base 58. Said dial base 58, which has a concentric opening 59, is secured to the slider 14 by means of screws 60. A bezel 63, which supports the dial face 16 as well as the face protecting glass 64, extends around and is supported upon the peripheral surface 66 of the dial base 58, which surface 66 contains an annular groove 67. Screws 68 are threadedly received through threaded openings 69 through the side wall of the bezel 63 for slidable reception into the groove 67. The screws 68 are tightened against the radially inner wall of the groove 67 in order to prevent relative rotation between the bezel 67 and dial base 58. Accordingly, after loosening the screws 68, the bezel 63 and the dial face 16 can be rotated with respect to the dial base 58 without removing the bezel from the dial base.

The gear 42 is coaxially secured to one end of a shaft 72 (Figure 3), which extends through the dial base 58 and a central opening 71 in the dial face 16. The other end of the shaft 72 is secured to the dial pointer 17 disposed between said dial face 16 and the protective glass 64. Accordingly, rotation of the gear 42 results in a corresponding rotation of the dial pointer 17 around the dial face 16. The gear 42 and the teeth on the rack 23 are carefully selected so that, in this particular embodiment, the gear 42, hence the pointer 17, rotates exactly 360° for each 0.200 of an inch of movement of the slider 14 along the guide member 11. Accordingly, and as shown in Figure 1, the circular scale on the dial face 16 is divided into 200 equal increments each of 0.001 of an inch. The dial base 58 (Figure 2) is secured to the beam 13 by means, such as the screw 70, so that the slider 14 will move with the beam 13. Under normal circumstances, the slider 14 is manually moved along the guide member 11, whereby the beam 13 is caused to move therewith. The beam 13 and slider 14 are constructed and assembled so that the slider 14 will be on one of the markings of the scales 54 and 55, respectively, when the element 33 is spaced from the positioning face 32 an even multiple of 0.200 of an inch.

A bar 73 is secured to and extends from one end of the slider 14 adjacent to the edge 74 of the guide member 11 and said bar 73 has a notch 76 opening toward said edge 74. A pair of spaced and coaxial disks 77, which have knurled peripheries, are secured to the opposite ends of the journal 78 which is slidably and rotatably disposed within the notch 76. The notch 76 is of sufficient depth that the disks 77 can rotate with respect to the bar 73 without engaging the edge 74 of the member 11. However, by manually urging said disks 77 toward the edge 74 they can be caused to engage said edge and thereby used to effect a small movement of the bar 73, hence the slider 14, along the member 11. The width of the notch 76, lengthwise of the guide member 11, is only slightly larger than the diameter of the journal 78 so that backlash is reduced to a minimum.

An elongated flat strip or shoe 83 (Figures 3 and 5) of smooth durable material, such as metal, is disposed in the channel 47 between the wall 84 thereof and the upper edge of the guide member 11. The slider 14 has a threaded opening 86 which penetrates said wall 84 and in which an adjustment screw 87 is received for urging the shoe 83 against the adjacent, upper edge of said guide member 11.

Operation

Having assembled the instrument 10, so that it is arranged as appearing in Figure 1, it may be desirable to check the accuracy of the instrument and make minor adjustments in the position pointer 17. For example, it is essential to have the pointer 17 on the zero position at the top of the dial face 16 in Figure 1 whenever the element 33 is spaced from the positioning face 32 an even multiple of 0.200 of an inch. It is at least desirable to have the two zero positions of the dial face 17 on a straight line perpendicular to the lengthwise extent of the guide member 11, as appearing in Figure 1.

In order to determine the need for such adjustments, the slider 14 is moved along the guide member 11 until the element 33 on the beam 13 is at an exact, known distance from the face 32. This distance is preferably an even multiple of 0.200 of an inch, so that the marks on the scales 54 and 55 will be aligned with the edges 52 and 53. If, under these conditions, the pointer 17 is exactly on zero and the two zero points lie on a straight line substantially perpendicular to the lengthwise extent of the guide member 11, no adjustment is required. If the pointer is only slightly off the zero position, such as less than 2 or 3 scale markings, adjustment is effected by moving the bezel 63. That is, the screws 68 are loosened so the bezel 63, hence the dial face 16 secured thereto, can be rotated around the dial base 58 until the zero position on said dial face is accurately aligned with the pointer 17. The screws 68 are then tightened and the adjustment is complete.

If, when the beam 13 is extended a known distance, the pointer 17 is a substantial distance away from the correct reading on the dial face 16, additional adjustment may be required. That is, merely adjusting the bezel 63 will correct the inaccuracy in reading, but will also move the zero point out of its desired location. Thus, before adjusting the bezel, the screws 27 are loosened and the rack 23 is moved with respect to both the guide member 11 and slider 14, thereby rotating the gear 42 and pointer 17, until the pointer is in approximately the correct position on the dial face 16. The screws 27 are tightened and the bezel is now loosened and rotated, if necessary, to produce the final adjustment in the reading of the pointer.

The ease or difficulty with which the slider 14 and beam 13 can be moved along the guide member 11 can be controlled by the shoe 83 and screw 87. That is, tightening of the screw 87 increases the drag and reduces the ease of movement between the guide member 11 and slider 14. The shoe 83 also takes up any play between the guide member 11 and the sidewalls of the channel 47.

When it becomes desirable to use the instrument 10 for measuring the location or axial dimension of a groove 18 (Figure 1) or other opening in the inner wall of a valve casing 82, for example, the positioning face 32 of the head 12 is placed against the outer edge of the casing 82 adjacent to the opening therein so that the outer end of the beam 13 extends into the casing 82. The slider 14 is then manually moved along the guide member 11 until the engaging element 33 drops into the groove 18. The knurled discs 77 are manually urged against the adjacent edge 74 of the guide member 11, as by means of the thumb, and carefully rotated so that the slider 14 is moved toward one end of the guide member 11. When positive contact is made between the engaging element 33 and the appropriate wall of the groove 18, a visual examination of the scale 55 (if the movement was rightward) and the position of the dial pointer 17 on the dial face 16 will indicate the exact distance in thousandths of an inch between the rightward edge of the groove 18 and the outer edge of the valve casing 82 adjacent to the face 32.

If it becomes desirable to measure also the axial extent of the groove 18, the slider 14 is moved leftwardly in this instance along the guide member 11, as appearing in Figure 1, until the engaging element 33 positively engages the opposite edge of the groove 18. Another reading is taken, this time on the scale 54 and the dial face 16, after which the first reading is subtracted from the second reading to produce the axial dimension of said groove 18. I will be seen that these dimensions can be accurately and quickly taken even though the exact location of the groove 18 with respect to the axial extent of the valve casing 82 is not known prior to the taking of such measurements.

As indicated above, the gear 42 is resiliently held against the rack 23 by the arm 37. However, there is sufficient space between the rack 23 and side wall 26 to permit disengagement between the rack and gear which serves as a quick release. That is, if either the beam 13 or slider 14 is urged along the guide member 11 by a sudden strong force, the arm 37 can flex sidewardly to permit disengagement of the gear from the rack, followed by unmeshed movement of the gear along the rack until such force is dissipated. Readjustment of the instrument can be effected by removing the bezel 63 and manually flexing the arm 37 while moving the beam and slider back to their proper positions.

Although a particular preferred embodiment of the invention has been disclosed in detail above for illustrative purposes, it will be understood that variations or modifications of such disclosure, which lie within the scope of the appended claims are fully contemplated.

What is claimed is:

1. A measuring instrument comprising: an elongated guide member having a lengthwise groove in one side thereof, one wall of said groove having teeth along a portion thereof; a transverse member at one end of said guide member having a planar surface remote from said guide member and perpendicular to the lengthwise extent thereof, said transverse member having an opening penetrating said surface substantially perpendicularly and communicating with said groove; a beam slidably disposed within said groove and extending through said opening, the outer end of said beam having a sidewardly projecting element secured thereto; a gear rotatably supported upon the inner end of said beam for toothed engagement with said toothed wall; a slider slidably supported upon said guide member for movement lengthwise thereof, said slider being secured to said beam and having a circular scale thereon coaxial with said gear; a pointer adjacent to said scale and means supporting said pointer upon said gear for rotation therewith, whereby movement of said beam with respect to said guide member effects a movement of said pointer along said scale.

2. The structure of claim 1 wherein said gear has an annular groove therein between the axial ends thereof, said beam has a resiliently flexible portion at said inner end thereof slidably receivable into the annular groove in said gear for continuously and resiliently urging said gear into engagement with said teeth on said one wall.

3. The structure of claim 1 wherein said one side of said guide member has two substantially identical scales on opposite sides of said groove, one scale being offset with respect to the other by an amount equal to the thickness of said sidewardly projecting element; and wherein said pointer makes one complete 360° sweep of said scale each time said slider moves along said member a distance equal to said offset.

References Cited in the file of this patent
UNITED STATES PATENTS

| | | |
|---|---|---|
| 443,869 | Riglander | Dec. 30, 1890 |
| 1,281,715 | Todt | Oct. 15, 1918 |
| 2,610,409 | Pistoles | Sept. 16, 1952 |
| 2,749,620 | Czaplinski | June 12, 1956 |